United States Patent Office 3,651,033
Patented Mar. 21, 1972

3,651,033
DYEABLE ACRYLONITRILE COPOLYMERS CONTAINING VINYL PHENYL ALKYL QUATERNARY AMMONIUM COMPOUNDS
Ardy Armen, Amsterdam, Netherlands, and Gary G. Hammer and John H. Hennes, Williamsburg, Va., assignors to The Dow Chemical Company, Midland, Mich.
No Drawing. Filed June 17, 1969, Ser. No. 834,158
Int. Cl. C08f 17/00
U.S. Cl. 260—80.72       6 Claims

ABSTRACT OF THE DISCLOSURE

Vinyl phenyl alkyl quaternary ammonium compounds, e.g. p-vinyl benzyl methyl morpholinium chloride, are copolymerized in amounts of 0.25 to 7% with at least 85% acrylonitrile and, 1 to 10% of a monomer copolymerizable with acrylonitrile, e.g. methyl acrylate. The resulting polymer, upon spinning, gives fibers having excellent dyeability and heat stability.

---

This invention relates to novel ternary polymers comprising a major proportion of acrylonitrile. More particularly, this invention relates to ternary polymers containing a small proportion of a quaternary ammonium compound for the purpose of improving the dyeability of fibers prepared from the ternary polymer.

The poor dyeability of pure acrylonitrile fibers with most classes of dyes is well-known. However, because of the wide utility of acrylonitrile fibers, it is desirable to render the fibers dyeable without harming or substantially effecting their desirable physical properties.

Accordingly, it is an object of this invention to prepare novel dyeable terpolymers comprising a major proportion of acrylonitrile.

A further object of this invention is the preparation of novel terpolymers with enhanced receptivity to acid dyes but containing a basic monomer at percentages which are small compared to the levels required in copolymeric compositions known in the art.

Still another object of this invention is the preparation of acrylonitrile terpolymers having enhanced dyeability characteristics without substantial sacrifice in physical properties such as heat stability.

Still other objects of this invention will be apparent from the following disclosure.

Briefly, this invention relates to terpolymers containing at least 85% by weight of acrylonitrile units, 1–10% by weight of units of other monoethylenically unsaturated monomers copolymerizable with acrylonitrile, and 0.25–7.0% by weight of the hereinafter defined quaternary ammonium monomer. Preferably the quaternary ammonium monomer is present in amounts ranging from 0.25–1.0% by weight of the terpolymer.

The quaternary ammonium monomers which comprise an essential component in the terpolymers of this invention are embraced by the general formula:

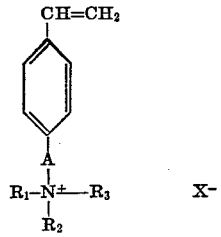

wherein A is alkylene; $R_1$ and $R_2$ are alkyl, or taken together they form a divalent saturated hydrocarbon radical, a divalent aromatic hydrocarbon radical, a divalent saturated heterocyclic radical in which the hetero-atom is O or N, or a divalent aromatic radical in which the hetero-atom is O or N; $R_3$ is alkyl, hydroxyalkyl or aralkyl; and $X^-$ is an anion.

Preferably, A is alkylene having 1 to 4 carbon atoms, e.g. methylene, ethylene, propylene, or butylene groups. $R_1$ and $R_2$ are preferably lower alkyl of 1 to 4 carbon atoms, e.g. methyl, ethyl, propyl or butyl groups. Taken together $R_1$ and $R_2$ are preferably divalent radicals containing 4 or 5 atoms which when attached to the nitrogen atom form a heterocyclic ring of 5 or 6 atoms. Illustrative of such heterocyclic rings are pyridine, pyrrolidine, pyrrole, piperidine, and morpholine. $R_3$ is preferably lower alkyl of 1 to 4 carbon atoms, e.g. ethyl, methyl, propyl or butyl, hydroxy alkyl having 1 to 4 carbon atoms in the alkyl group or phenyl alkyl wherein the alkyl groups contains 1 to 4 carbon atoms, e.g. benzyl, phenylethyl, phenylpropyl, and phenylbutyl.

Illustrative examples of anions represented by $X^-$ in the above formula are the chloride, bromide, iodide, sulphate, sulphonate, phosphate, hydroxide, borate, cyanide, carbonate, hydrocarbonate, thiocyanate, thiosulphate, isocyanate, sulfite, bisulfite, nitrate, nitrite, oxalate, silicate, sulfide, cyanate, and acetate. Other inorganic and organic anions can also be used.

The quaternary ammonium monomers utilized in this invention can be prepared by methods known in the art and as described in U.S. Pat. 2,941,969.

The novel terpolymers of this invention can be polymerized by common methods for polymerizing ethylenically unsaturated compounds. For example, the polymerization can be carried out by a slurry polymerization technique using a redox catalyst system. Polymerization in an aqueous saline solution however is preferred for the reason that the resulting terpolymer can be directly spun into fibers from the polymerization medium.

The preferred polymerization techniques involves reacting a mixture of the polymerizable monoethylenically unsaturated monomers in an aqueous saline solution in the presence of a free radical liberating, addition polymerization initiator. Suitable polymerization initiators include the water soluble peroxy compounds, e.g. $H_2O_2$ and $Na_2O_2$. The polymerization is carried out at temperatures of up to 80° C., the exact temperature selected being dependent on the particular initiator, or initiator system being used. Most preferably the temperature is in the range of 40 to 80° C. Below 40° C. the reaction will not start. Above 80° C. polymer degradation occurs.

The most preferred catalyst system is $H_2O_2$ in amounts ranging from 0.08 to 2.0% by weight of the monomers. Below 0.08% conversion is low and above 2.0% the molecular weight of the polymer decreases. $Fe^{+++}$ ion is preferably present in amounts ranging from 2 to 5 p.p.m. of $Fe^{+++}$ ion based on the monomers. Outside this range molecular weight of the terpolymer is adversely effected. A molecular weight regulator, preferably $Cu^{++}$ ion is added in amounts ranging from 0.22–0.27 p.p.m. of $Cu^{++}$ ion based on the monomers. Outside this range the molecular weight of the polymer is adversely effected.

The preferred polymerization medium is approximately 60% aqueous $ZnCl_2$ solution. The use of the above reaction medium allows direct spinning into a coagulation bath containing lesser amounts of $ZnCl_2$, e.g. about 45%, in the known manner.

In general the terpolymers of this invention comprise (A) 0.25 to 7.0 weight percent of the quaternary ammonium monomer described above. Preferably the quaternary ammonium monomer is present in amounts of 0.25 to 1.0 weight percent since amounts in excess of 1.0 weight percent tend to adversely effect the heat stability of the terpolymer.

(B) 85 to 98.75 weight percent of acrylonitrile.
(C) 1 to 10 weight percent of an alpha, beta-ethylenically unsaturated monomer copolymerizable with acrylonitrile and different from A and B.

The total of the weight percentages of the above monomers is selected to total 100.

The alpha, beta-ethylenically unsaturated monomer copolymerizable with acrylonitrile can in general be any of the monomers which are known to be polymerizable with acrylonitrile. Preferably, however, these are the lower esters, amides or nitriles or acrylic or methacrylic acid or materials such as vinyl acetate. Illustrative suitable monomers are methylacrylate, methylmethacrylate, ethylacrylate, acrylamide, methacrylamide, methacrylonitrile, and vinyl acetate.

As stated above, the terpolymers of this invention find particularly utility in the formation of fibers which can be more readily and effectively dyed especially with acid dyes. Furthermore, the fibers exhibit minimal detrimental effects on their physical characteristics by virtue of the incorporation of the novel quaternary ammonium monomers.

In order that those skilled in the art may better understand how the present invention can be carried out, the following examples are given by way of illustration and not by way of limitation. All parts and percentages are by weight.

EXAMPLES 1–3

These examples illustrate the preparation of the novel acrylonitrile copolymers of this invention in the form of spinnable mixtures.

Example 1

A reaction vessel equipped with a stirrer and thermometer is placed in a constant temperature bath which is maintained at 45° C. To the vessel is added a mixture of 60% aqueous $ZnCl_2$ solution, 89.0 parts of acrylonitrile, 10.1 parts methyl acrylate, 0.3 part (p-vinyl) benzyl methyl morpholinium chloride, 2.5 p.p.m. $Fe^{+++}$ and 0.25 p.p.m. $Cu^{++}$. The pH of the mixture (10:1 dilution) is 2.5. The reaction is initiated by the addition of 0.09 part hydrogen peroxide. The reaction mixture was stirred for 3–4 hours at which time polymerization was complete.

The conditions and quantities were chosen so as to obtain a spinnable composition: 2000–3000 poise at 22° (Brookfield) and 9–10% solids.

Example 2

The procedure of Example 1 was repeated except that (p-vinyl) benzyl trimethyl ammonium chloride,

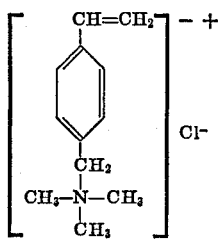

was substituted on an equivalent basis for the (p-vinyl) benzyl methyl morpholinium chloride used therein.

Example 3

The procedure of Example 1 was repeated except that (p-vinyl) benzyl methyl piperidinium chloride,

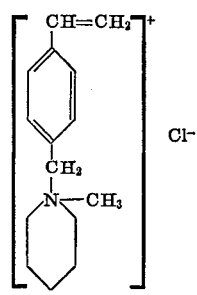

was substituted on an equivalent basis for the (p-vinyl) benzyl methyl morpholinium chloride used therein.

EXAMPLES 4–6

These examples illustrate the preparation of fibers and the dyeing of fabrics derived from each of the copolymers prepared in Examples 1–3.

The polymer solutions obtained in each of Examples 1–3 are debubbled to remove unreacted monomer and dissolved gas and then extruded through a multiorifice spinnerette into a coagulation bath containing about 44% zinc chloride solution at 17° C. The so-coagulated filaments are washed with water to reduce their salt content and then stretched about 1000% while passing through a hot water bath maintained at a temperature of 99.5° C. The filaments are then dried in a relaxed state in an oven set at about 125° C. The dried fibers are knit into fabric and swatches are dyed with Calcocid Alizarine Blue SBA. The fiber dyes to much deeper shades than do either pure polyacrylonitrile fiber or fiber obtained from acrylonitrile-methyl acrylate copolymer.

Example 4

This example comprises an evaluation of certain of the fibers prepared in accordance with the method of this invention.

Terpolymers were prepared as in Example 1 except that the amount of methyl acrylate charged was 8% in all cases. The amount of quanternary ammonium monomer was varied as indicated in the summary of results in Table I below. The dye used was Calcocid Alizarin Blue SBA. Evaluation tests were run on undyed and dyed fibers. These tests included:

(A) Washfastness test.—Dyed samples were laundered in a 0.5% soap solution at 160° F. for 30 minutes. The following are determined:

(1) Colorfastness is determined by a color change rating which is a qualitative visual examination of the alteration in color of the dyed sample caused by laundering. The samples are given a numerical rating 1–5, 5 indicating no change or negligible change after laundering.

(2) Bleed, a determination of the discoloration of the wash liquor caused by color bleed from the dyed sample during laundering, rating system same as (1).

(3) Stain, an undyed standard multifiber test cloth (acetate, cotton, nylon, Zefran, viscose, wool) is laundered along with a sample of dyed fabric. The samples are given a numerical rating, 1–5, 5 indicating no staining.

(B) Lightfastness is determined by exposing dyed knit samples of the fiber in a Fade-Ometer (carbon arc) for 20 hours according to the procedure described at page B–61 of the AATCC Technical Manual, Part II (1962 edition). Lightfastness is rated according to the Grey Scale method described at page 48 of this manual. A rating of 5 indicates no difference in color (shade and strength) between a standard and the test specimen. Lower numbers indicate decreasing color stability.

(C) Initial color is a measure of whiteness of the undyed fiber and is determined as follows: The fiber is cut into small pieces and chopped into a slurry in a Waring Blendor. The slurry is then filtered through a Büchner-type funnel to form a pad which is then dried. L and b values are determined with a Hunter color and color difference meter, L=lightness, b=yellowishness. The numerical rating given for whiteness is obtained using the formula L−3b. The higher the numerical rating, the whiter the sample.

(D) Heat stability.—The fiber pad is placed between the plates of an AATCC scorch tester at 205° C. for five minutes. The measuring head of a Photovolt Corporation reflectometer fitted with a green tristimulus filter is placed first on the unscorched portion of the fiber pad and the instrument adjusted for a reflectance reading of 100; a reflectance reading is then taken on the scorched portion of the fiber pad. The difference in reflectance is a measure of the color formations due to heat. The smaller recorded values indicating better heat stability of the polymer.

selected from the group consisting of the methyl and ethyl esters of acrylic and methacrylic acid, acrylamide, methacrylamide, methacrylonitrile and vinyl acetate;

the total of said weight percentages being 100.

2. A composition of matter comprising the copolymerized product of
  (A) 0.25 to 1.0 percent of the monomer (p-vinyl) benzyl methyl morpholinium chloride, or (p-vinyl) benzyl methyl piperidinium chloride;
  (B) 89 to 98.75 weight percent of acrylonitrile; and
  (C) 1 to 10 weight percent of α,β-ethylenically unsaturated monomer copolymerizable with acrylonitrile selected from the group consisting of the methyl and ethyl esters of acrylic and methacrylic acid, acrylamide, methacrylamide, methacrylonitrile and vinyl acetate;

the total of said weight percentages being 100.

TABLE I

| Basic monomer | Percent charged | Dyed fiber wash test | | | | Undyed fiber | |
| --- | --- | --- | --- | --- | --- | --- | --- |
| | | Color change | Bleed | Stain [1] | Light fastness | Initial color L−3b | Heat stability |
|  | 0.25 | 4–5 | 5 | 4–5 | 4–5 at 20 | 62.9 | 34.5 |
| | 0.50 | 5 | 5 | 4–5 | 3–4 at 40 | 69.8 | 42.0 |
|  | 1.0 | 5 | 4 | 5 | 4–5 at 40 | 60.4 | 63.0 |
| | 0.5 | 4–5 | 3 | 4 | 4 at 80 | 65.5 | 67.5 |
| | 0.25 | 4–5 | 4 | 4–5 | 4 at 100 | 75.3 | 44.0 |
|  | 0.25 | 3–4 | 4 | 4 | 4 at 60 | 68.7 | 38.5 |
| | 0.50 | 4 | 4 | 4 | 4 at 60 | 66.9 | 47.5 |
| | 0.90 | 3–4 | 4 | 4–5 | 4 at 60 | 56.9 | 58.5 |

[1] All the fibers in the multifiber test fabric rated 5 except nylon, the results of which are listed in the stain column.

What is claimed is:

1. A composition of matter comprising the copolymerized product of
  (A) 0.25 to 7.0 weight percent of the monomer (p-vinyl) benzyl methyl morpholinium chloride, or (p-vinyl) benzyl methyl piperidinium chloride;
  (B) 85 to 98.75 weight percent of acrylonitrile; and
  (C) 1 to 10 weight percent of α,β-ethylenically unsaturated monomer copolymerizable with acrylonitrile 3. The composition of matter of claim 1 wherein the C monomer is methyl acrylate.

4. The composition of matter of claim 1 wherein A is present in the amount of 0.25 to 1.0 weight percent and C is present in the amount of about 10 weight percent.

5. The composition of matter of claim 1 wherein the A monomer is (p-vinyl) benzyl methyl morpholinium chloride.

6. The composition of matter of claim 1 wherein the A monomer is (p-vinyl) benzyl methyl piperidinium chloride.

References Cited

UNITED STATES PATENTS

| | | | |
|---|---|---|---|
| 2,691,640 | 10/1954 | Patterson et al. | 260—41 |
| 2,941,969 | 6/1960 | Price | 260—29.6 |
| 3,065,212 | 11/1962 | Milford et al. | 260—85.5 |
| 3,135,812 | 6/1964 | Taniya et al. | 264—182 |

JAMES A. SEIDLECK, Primary Examiner

S. M. LEVIN, Assistant Examiner

U.S. Cl. X.R.

8—55; 260—80.73

UNITED STATES PATENT OFFICE
CERTIFICATE OF CORRECTION

PO-1050 (5/69)

Patent No. 3,651,033      Dated 21 March 1972

Inventor(s) Ardy Armen, Gary G. Hammer and John H. Hennes

It is certified that error appears in the above-identified patent and that said Letters Patent are hereby corrected as shown below:

Column 3, line 12, change "nitriles or acrylic" to --nitriles of acrylic--.

line 18, change "particularly" to --particular--.

Column 5, Table I, delete "0" in the last formula so that it reads:

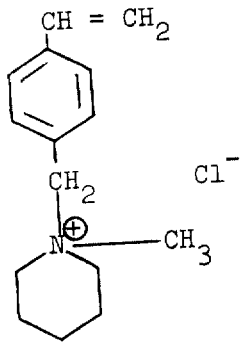

Signed and sealed this 10th day of October 1972.

(SEAL)
Attest:

EDWARD M. FLETCHER, JR.
Attesting Officer

ROBERT GOTTSCHALK
Commissioner of Patents